United States Patent [19]

Chung

[11] Patent Number: 5,599,593
[45] Date of Patent: Feb. 4, 1997

[54] LIQUID CRYSTAL DISPLAY DEVICE USING MAIN-CHAIN POLYESTER LIQUID CRYSTAL POLYMER

[75] Inventor: Seong-eun Chung, Seoul, Rep. of Korea

[73] Assignee: Samsung Display Devices, Co. Ltd., Kungki-Do, Rep. of Korea

[21] Appl. No.: 366,724

[22] Filed: Dec. 30, 1994

[30] Foreign Application Priority Data

May 27, 1994 [KR] Rep. of Korea .................. 94-11586

[51] Int. Cl.$^6$ .................................................. G02F 1/1337
[52] U.S. Cl. .................................................. 428/1; 349/123
[58] Field of Search .................................... 428/1; 359/75

[56] References Cited

U.S. PATENT DOCUMENTS

| | | | |
|---|---|---|---|
| 4,367,924 | 1/1983 | Clark et al. | 350/334 |
| 4,469,408 | 9/1984 | Krueger et al. | 350/340 |
| 4,563,059 | 1/1986 | Clark et al. | 350/330 |
| 4,813,767 | 3/1989 | Clark et al. | 350/341 |
| 5,067,797 | 11/1991 | Yokokura et al. | 359/76 |

FOREIGN PATENT DOCUMENTS

| | | |
|---|---|---|
| 62-209415 | 9/1987 | Japan . |
| 62-211617 | 9/1987 | Japan . |
| 62-227122 | 10/1987 | Japan . |

*Primary Examiner*—Alexander Thomas
*Attorney, Agent, or Firm*—Leydig, Voit & Mayer

[57] ABSTRACT

A ferroelectric liquid crystal display device is provided including a pair of upper and lower substrates, transparent electrodes formed on each substrate, orientation layers formed on each transparent electrode and rubbed in a prescribed direction, and a ferro-electric liquid crystal injected between said orientation layers, wherein said orientation layer comprises a main-chain polyester liquid crystal polymer having one of the following formulae I and III:

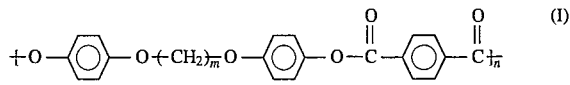

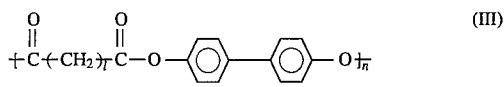

wherein m is an integer between 4 and 12, n is an integer between 100 and 200 and f is an integer between 4 and 12.

2 Claims, 5 Drawing Sheets

LIQUID CRYSTAL DISPLAY DEVICE USING MAIN-CHAIN POLYESTER LIQUID CRYSTAL POLYMER

BACKGROUND OF THE INVENTION

The present invention relates to a liquid crystal display device using a main-chain polyester liquid crystal polymer as an orientation layer and having uniform orientation and good memory characteristics.

Generally speaking, a liquid crystal is a meso-material between liquid and solid states which has the flow characteristics of a liquid and the optical properties of a solid. A liquid crystal can change its optical anisotropy by means of an electric field or heat being applied thereto. A liquid crystal display (LCD) device using these characteristics is one type of flat panel display device, and includes a plasma display device and an electro-luminescence display device.

The limitation of the response time of the conventional twisted nematic liquid crystal is 10 ms–20 ms. A ferroelectric liquid crystal (SmC* phase, SmH* phase, etc.) having a faster response time by improving the problem, and a liquid crystal panel using this was reported in 1980 (*Applied Physics Letters,* Vol. 36, p899) by N. A. Clark and S. T. Lagerwell (see also U.S. Pat. Nos. 4,367,924, 4,563,059, 4,813,767 and others).

In the case of manufacturing a liquid crystal panel using a ferroelectric liquid crystal, the most important subject is the development of materials for orientating the liquid crystal uniformly to obtain good electro-optic properties and good bistability. The above-mentioned U.S. patents describe methods for achieving uniform orientation by applying a strong electric field or a stress. However, since the space between the two substrates filled with liquid crystal and sealed is as narrow as 2 μm or less, these methods are very difficult to practice and are thus somewhat impractical.

Meanwhile, various research efforts on separate orientation layers of liquid crystals for uniform orientation have been carried out. Various orientation layers for use in LCD devices are known. Namely, inorganic orientation layers manufactured by vacuum deposition of inorganic compounds such as $SiO_x$ (where x is an arbitrary value between 1 and 2) and organic orientation layers manufactured by forming a film of organic polymer such as polyimide and rubbing the film with a cloth can be illustrated. Recently, the Langmuir-Blodgett (LB) method was suggested. The LB methods employ a uni-molecular uni-layer or uni-molecular multi-layer of a polyimide.

However, each of the above-mentioned orientation layers have many defects. In the case of an inorganic orientation layer, productivity is lowered for mass production, since vacuum chamber equipment for orientation layer formation is needed. On the other hand, mass production is advantageously achieved in the case of an organic orientation layer, but formation of a polymer coating layer having uniform thickness is difficult and the surface of the orientation layer is contaminated owing to the electrostatic charge generated during the rubbing treatment.

In the case of using a method employing a uni-molecular LB layer (see Japanese Patent Laid-open Publication sho 62-209415, 62-211617 and others), no problem is induced by the electrostatic charge, but the mass production capability thereof is poor. That is, the polymer layer manufactured by the LB method has a uni-molecular layer which is too thin (about 4 Å) and so the ITO electrodes cannot be shielded. This is undesirable for displays. Moreover, since, considering such display characteristics, the thickness of the organic orientation layer should be 500 Å or more, in order to obtain a 500 Å-thick layer by the LB method, about 125 layers of the 4 Å-thick LB layer should be stacked. This lowers work processability remarkably, thus the LB method is not applicable in practical production.

To improve the above-mentioned defects, U.S. Pat. No. 5,067,797 discloses a method for manufacturing a uni-molecular or multi-molecular layer by a water spreading method. In this method, a polymer material is dissolved in a solvent to be spread on the surface of a body of water and is then coated on the substrate to form a thin film. The coated polymer film (polyimide (PI) or liquid crystalline polymer (LCP)) is rubbed or pressed in one direction using a roller, to form an orientation layer in which molecules align anisotropically. By this method, since the thickness of the uni-molecular layer can be somewhat controlled, the number of layer coating operations can be reduced. However, the coating efficiency is lowered and the production process for forming the orientation layer on the panel is complicated when compared with the conventional coating method. That is, this method still includes weak points in terms of processability and mass production.

Another trial for employing a liquid crystal polymer as the orientation layer is disclosed in Japanese Patent Laid-open Publication No. sho 57-40228. In this patent, contrast is improved by the elimination of disclination (discontinuous orientation) at the interface of the liquid crystal and the orientation layer by combining a side-chain mesogen with the main chain and pre-tilting the mesogen group in the orientation layer along with the liquid crystal molecules under an electric field, to thereby minimize light loss at the interface of the pre-tilted liquid crystal and the orientation layer. However, if the mesogen in the orientation layer actually moves with the liquid crystal layer according to the applied voltage, a very slow response results and high driving voltage is needed. Moreover, since the mesogen used is an alkyl mesogen, the pre-tilting becomes more difficult. Even though the liquid crystal is oriented, the side chain mesogen is liable to induce a relaxation phenomenon by a molecular fluctuation so that bistability is very difficult to maintain.

Japanese Patent Laid-open Publication sho 62-227122 discloses a method of coating a side-chain polymer used as an orientation layer and rubbing the coating in an isotropic or liquid crystal phase to achieve orientation of the layer. This method seems desirable in using the inherent properties of a liquid crystal, that is, the tendency of being changed between the liquid crystal phase and isotropic phase by external stimulation. However, actually, the orientation between the liquid crystal phase and the isotropic phase is not easy and even though orientation is obtained, orientation disruption due to the continuous stress relaxation of the side-chain polymer easily occurs.

SUMMARY OF THE INVENTION

An object of the present invention considering the conventional defects is to provide a liquid crystal display device having good electro-optic characteristics and bistability, uniform orientation without orientation disruption due to stress relaxation, by using a main-chain liquid crystal polymer instead of the conventional orientation layer of polyimide (PI), polyvinyl alcohol (PVA), etc.

To accomplish the object, there is provided a ferroelectric liquid crystal display device comprising a pair of upper and lower substrates, transparent electrodes formed on each substrate, orientation layers formed on each transparent electrode and rubbed in a prescribed direction, and a ferroelectric liquid crystal injected between the orientation layers, wherein the orientation layer comprises a main-chain polyester liquid crystal polymer.

Preferably, the main-chain polyester liquid crystal polymer has the formulae I, II or III, as below.

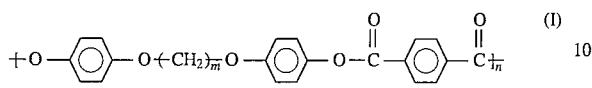

Here, m is an integer between 4 and 12 and n is an integer between 100 and 200.

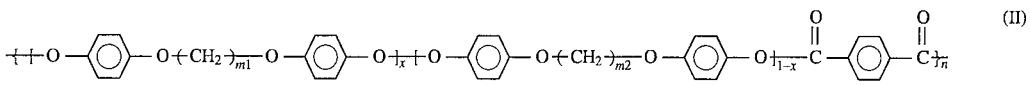

Here, $m_1$ and $m_2$ are integers between 4 and 12 and x is arbitrary value between 0 and 1.

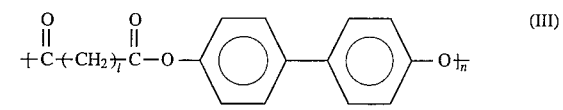

Here, l is an integer of 4–12 and n is an integer of 100–200.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
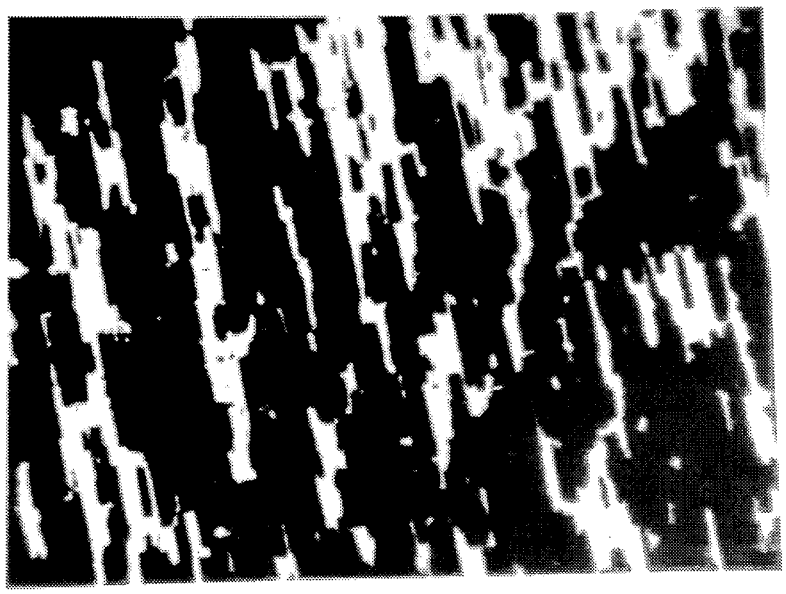
FIG. 1 is a 250× cross-nicol polarizing microscopic photograph of the orientation state of liquid crystal prepared according to the Comparative Example 1 in which RN 715, a commercial orientation film material manufactured by Nissan Chemical Industries Limited is used as an orientation layer.

The polyester liquid crystal having the general formula I of the present invention is prepared by condensation polymerization of dihydroxide compound A and terephthaloyl chloride D in a ratio of 1:1. The conventional methods can be used as the polymerization methods (see *Journal of Polymer Science: Polymer Chemistry Edition*, Vol. 19, p1909, 1981, and Vol. 22, p3189, 1984).

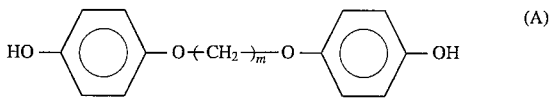

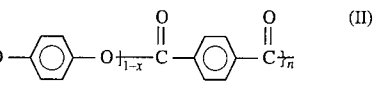

-continued

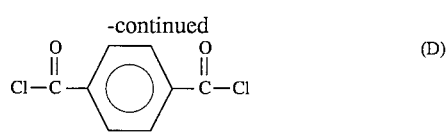

Here, m is an integer between 4 and 12.

The polyester liquid crystal having the general formula II used in the present invention is prepared by condensation polymerization of a mixture E obtained by mixing the compound A with the compound A', which is the same as compound A in all represents except that it has a different m value, and the compound D in a ratio of 1:1.

The polyester liquid crystal having the general formula III used in the present invention is prepared by condensation polymerization of the following dicarboxyl acid B and 4,4'-diacetoxyl biphenyl C in a ratio of 1:1. The conventional polymerization method can be applied (see *Journal of Polymer Science: Polymer Physics Edition*, Vol. 21, p1119, 1983; and *Macromolecule*, Vol. 16, p1271, 1983).

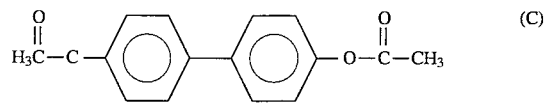

Here, l is an integer between 4 and 12.

The liquid crystal display device according to the present invention includes an orientation layer formed by coating a polyester liquid crystal polymer of the general formula I, II or III on the upper and lower substrates to a thickness on the order of hundreds of angstroms. When polyester dissolved in a solvent is used for uniform coating, the preferred concentration is 0.01 wt %–5 wt %. The concentration and coating velocity is controlled so that the coating thickness of the orientation layer does not exceed 1000 Å. Generally, if the inherent viscosity is about 0.7 dl/g, the preferred concentration is 0.01 wt %–1 wt %. At this time, a preferred solvent is parachlorophenol or a mixed solution of phenol/tetrachloroethane (60:40).

After coating the orientation layer, the layer is rubbed at an ambient temperature or above. During the rubbing, it is preferred that the temperature is not higher than the Tg-glass transition temperature or phase transition temperature. The orientation treatment is carried out by the conventional method of rubbing with cloth, such as nylon or rayon, The mesogen group in the liquid crystal polymer of the present invention is easily oriented by the external rubbing owing to the inherent property of the liquid crystal and has a long stress relaxation time in contrast to that of the side-chain polymer. The liquid crystal display device of the present invention can be widely applied as a light display device, a memory device, product label, etc. Accordingly, a liquid crystal display device having good orientating ability is manufactured by using the main-chain polyester liquid crystal polymers as an orientation layer in the conventional TN or STN liquid crystal panel or ferroelectric liquid crystal panel. Moreover, the orientation and thickness of the orientation layer is advantageously controlled by controlling the thickness of the orientation layer through the controlling of the coating thickness of the main-chain liquid crystal polymer, and the work processability is good owing to the ease of coating with an organic solvent. The ferroelectric liquid crystal used in the liquid crystal display device of the present invention has good orientation characteristics owing to the affinity between the main-chain liquid crystal mesogen of the liquid crystal polymer and the ferroelectric liquid crystal mesogen, and experiences no orientation disruption owing to the a slow relaxation characteristic. Therefore, a ferroelectric liquid crystal panel having a good electro-optic characteristic and bistability can be manufactured. In the case of a ferroelectric liquid crystal panel, generally, if the memory characteristic is improved by the interaction between the liquid crystal and the orientation layer, the response time is slowed. However, in the case of the liquid crystal display device of the present invention, the response time is very fast.

The preferred embodiments of the present invention will be described below referring to the attached drawings in detail. However, the present invention is not limited to these embodiments.

EXAMPLE 1

A homopolyester liquid crystal polymer having m=6 (LCPm06) in the general formula I was prepared by a condensation reaction of dihydroxy compound A with terephthaloyl chloride D in a ratio of 1:1 according to the conventional method. (see *Journal of Polymer Science: Polymer Chemistry Edition,* Vol. 19, p1909, 1981, and Vol. 22, p3189, 1984). This liquid crystal polymer had a Tm of 300° C. and an intrinsic viscosity of 0.81 dl/g.

The homopolymer LCPm06 was dissolved in parachlorophenol to obtain a 0.2 wt % solution before coating on a glass substrate. The dissolving process was carried out at 60° C. which is higher than the melting point (45° C.) of parachlorophenol. To remove the impurities, the solution was filtered using a syringe filter having a pore size of 0.2 μm. Then the solution was thinly coated using a spin coater at 3,000 rpm. At this time, the coating velocity can be adjusted as desired considering the coating thickness, coarseness of the coating surface, etc. Subsequently, the solvent was completely evaporated. Then, the layer was rubbed using the conventional orientation method. On one substrate of the thus-manufactured liquid crystal panel, a sealant was printed, while on the other substrate, 1.5 μm spacers were coated. A void cell was manufactured using a vacuum press. FELIX-T250 a liquid crystal material used for liquid crystal display devices, manufactured by Hoechst Japan was injected into the void cell at 90° C., which is above the isotropic temperature (85° C.), to manufacture a ferroelectric liquid crystal panel.

EXAMPLE 2

A liquid crystal polymer where m is 10, in the formula I (LCPm10), in which Tg=183° C., Tm=270° C., Ti=327 and the intrinsic viscosity is 0.7 dl/g was synthesized. A ferroelectric liquid crystal panel was manufactured according to the same method as described in the Example 1, except that the prepared LCPm10 was dissolved in phenol/tetrachloroethane (60:40) to obtain a 0.18 wt % solution.

EXAMPLE 3

A copolymer liquid crystal polymer (COLCP 25) where $m_1$ is 4 and x is 0.25 in the formula II, Tm=230° C. and the intrinsic viscosity is 0.77 dl/g and a copolymer COLCP 75 where $m_2$ is 6 and x is 0.75 in the formula II, Tm=220° C. and the intrinsic viscosity is 0.72 were synthesized according to the same method described in Example 1 Liquid crystal panels were manufactured according to the same method as described in Example 1 using a 0.2 wt % solution of the copolymers dissolved in parachlorophenol.

EXAMPLE 4

A liquid crystal polymer (ACLCP) where Tm=248° C., Ti=248° C. and the intrinsic viscosity is 0.53 dl/g was synthesized by condensation polymerization of dicarboxylic acid compound B (m=4) and diacetoxy compound C in a ratio of 1:1 according to the method described in the above-mentioned journal (see *Journal of Polymer Science: Polymer Physics Edition,* Vol. 21, p1119, 1983; and *Macromolecule,* Vol. 16, p1271, 1983). A liquid crystal display device was manufactured using a solution prepared by dissolving the prepared liquid crystal polymer in parachlorophenol in 0.2 wt % concentration and following the method described in example 1.

Comparative Example 1

A liquid crystal polymer solution was prepared using a polyimide compound of RN305 and RN715 (each being an orientation film material used for liquid crystal display devices, manufactured by Nissan Chemicals Industries). At that time, RN 715 (6 wt %) was diluted to a 3 wt % solution by using NMP/butyl cellosolve (75:25).

The solution was coated on a conductive layer using a spin coater at 3,000 rpm, pre-dried at 80° C. for ten minutes and cured at 260° C. A ferroelectric liquid crystal panel was completed by injecting FELIX-T250 liquid crystal (or ZL14655-100, a liquid crystal material used for liquid crystal display devices and manufactured by Merck) into an void cell manufactured by the conventional method.

Comparative Example 2

By dissolving side-chain liquid crystal polymer PCBEA (poly-4-cyanobiphenyloxy ethylene acrylate) represented as the following structure N-methyl pyrrolidone (NMP), a 1 wt % solution was prepared. The solution was coated on a conductive layer using a spin coater at 3,000 rpm, pre-dried at 80° C. for five minutes and completely dried at 180° C. for thirty minutes. Thereafter, the orientation layer was rubbed for orientation treatment and a void cell was manufactured by the conventional method. FELIX-T250 liquid crystal was injected into the cell, to obtain a ferroelectric liquid crystal display device.

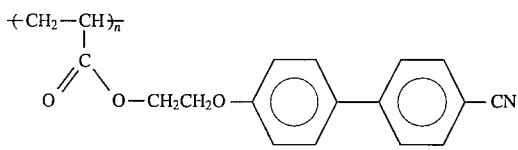

Here, n is ≧20.

Comparative Example 3

A ferroelectric liquid crystal display device was manufactured according to the same method as described in the Comparative Example 1, except that a side-chain liquid crystal polymer PMBCCP (poly-4-methoxy biphenyloxy carbonyl cyclopentane) was used.

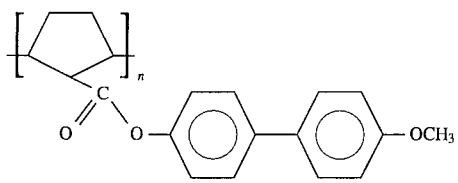

Here, n is ≧20

The characteristics of liquid crystal display devices manufactured by the above examples and comparative examples will be described by referring to the attached drawings.

The orientation layer of LCD according to the Comparative Example 1 exhibits an unstable zigzag orientation as shown in FIG. 1. For the liquid crystal display device according to the Comparative Example 1, a uniform orientation with electric field as required can be accomplished. However, the memory characteristics and bistability properties are remarkably lowered. That is, if the electric field is eliminated, the state of the liquid crystal becomes the original bonding state representing zigzag orientation. Accordingly, the contrast ratio, as well as memory stability, is remarkably lowered.

Figure 2:
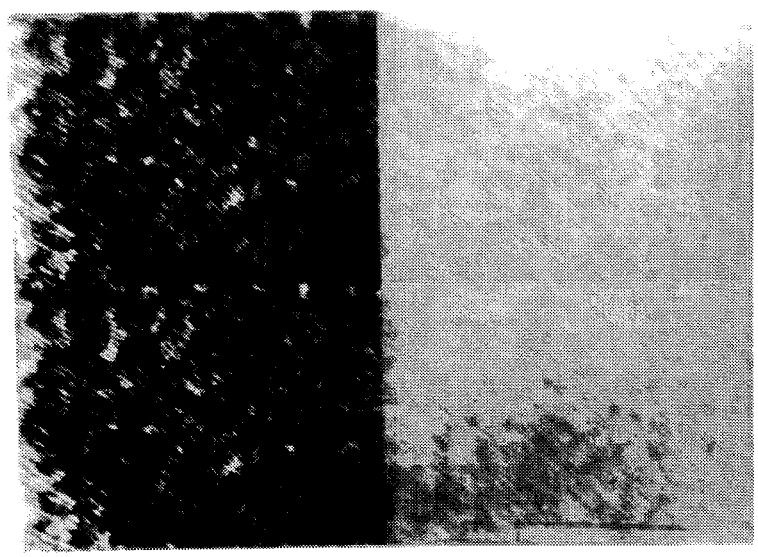
FIG. 2 is a 1,000× cross-nicol polarizing microscopic photograph of the orientation state of a liquid crystal prepared according to Example 1 in which a main-chain liquid crystal polymer as an orientation layer is used.

Meanwhile, the orientation layer of Example 1 shows an orientation state of a typical bookshelf structure as shown in FIG. 2. Particularly, if a stronger electric field is applied, more of this structure appears. The texture is a typical shape when observing at a magnification of 1,000×. Here, the left portion in FIG. 2 show the reverse state of the right portion when an electric field is applied.

Figure 3A:
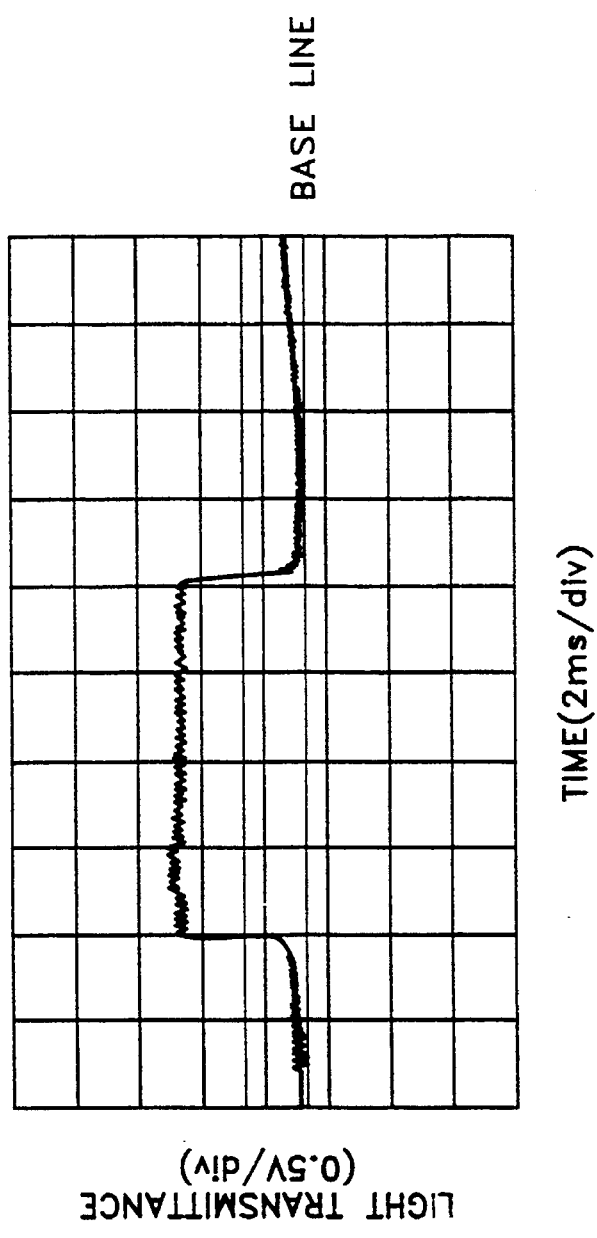
FIGS. 3A and 3B represent bistability and contrast ratio (FIG. 3A) and the characteristics showing applied voltage, pulse size and period thereof (FIG. 3B), where a liquid crystal polymer prepared according to Example 2 of the present invention ms used as an orientation layer.
Figure 3B:
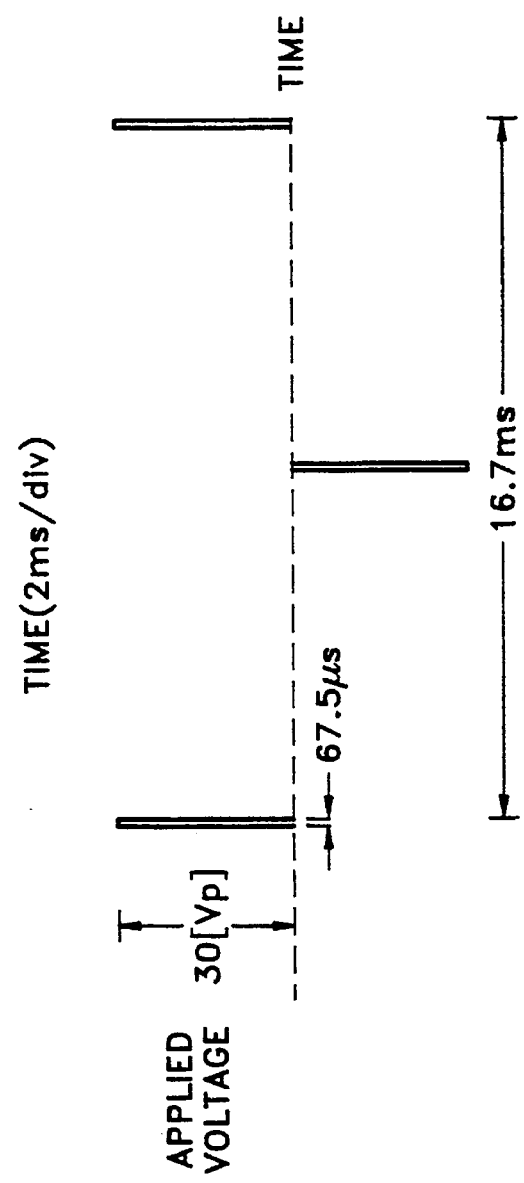

FIGS. 3A and 3B represent bistability and contrast ratio (FIG. 3A) and the size and period of the applied pulse (FIG. 3B). Here, it is known that there is little change of light transmittance even though no voltage is applied after a step pulse application, while a little "jump" is observed (a phenomena in which there is a change of light intensity due to the orientation disruption when removing the applied voltage). It is also known that contrast ratio (the on/off ratio of light transmittance with respect to the base line) is very high. The response velocity of this panel is as high as 112 µs when driving with an applied voltage of 5 Vp at 30 Hz.

Since the orientation characteristics and the driving characteristics of the liquid crystal display devices according to Examples 3 and 4 are same or similar to those according to the Examples 1 and 2 using homopolymer liquid crystal as an orientation layer, the explanation with reference to the drawings will be omitted.

Figure 4A:
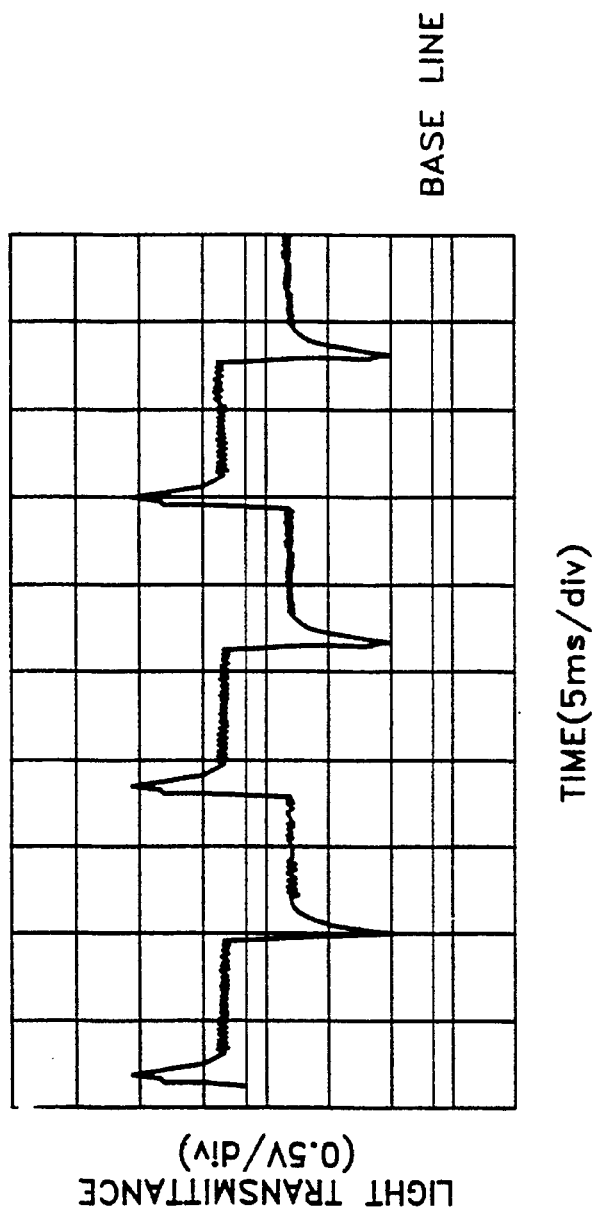
FIGS. 4A and 4B represent bistability and contrast ratio of a LCD according to Comparative Example 1 (FIG. 4A) and the characteristics showing applied voltage, pulse size and period thereof (FIG. 4B), where RN715 is used as an orientation layer.
Figure 4B:
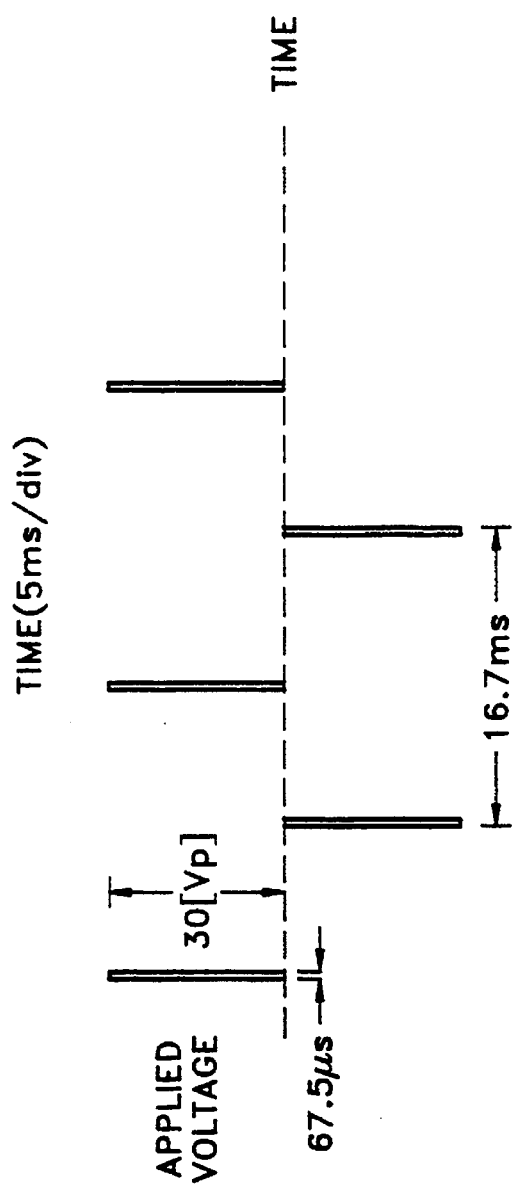

For the comparative example using RN715 as an orientation layer, both bistability and contrast ratio were not good, as shown in FIGS. 4A and 4B. Particularly, when the voltage for generating an electric field is eliminated, light transmittance is not constant and is lowered resulting in an orientation disruption.

Figure 5:
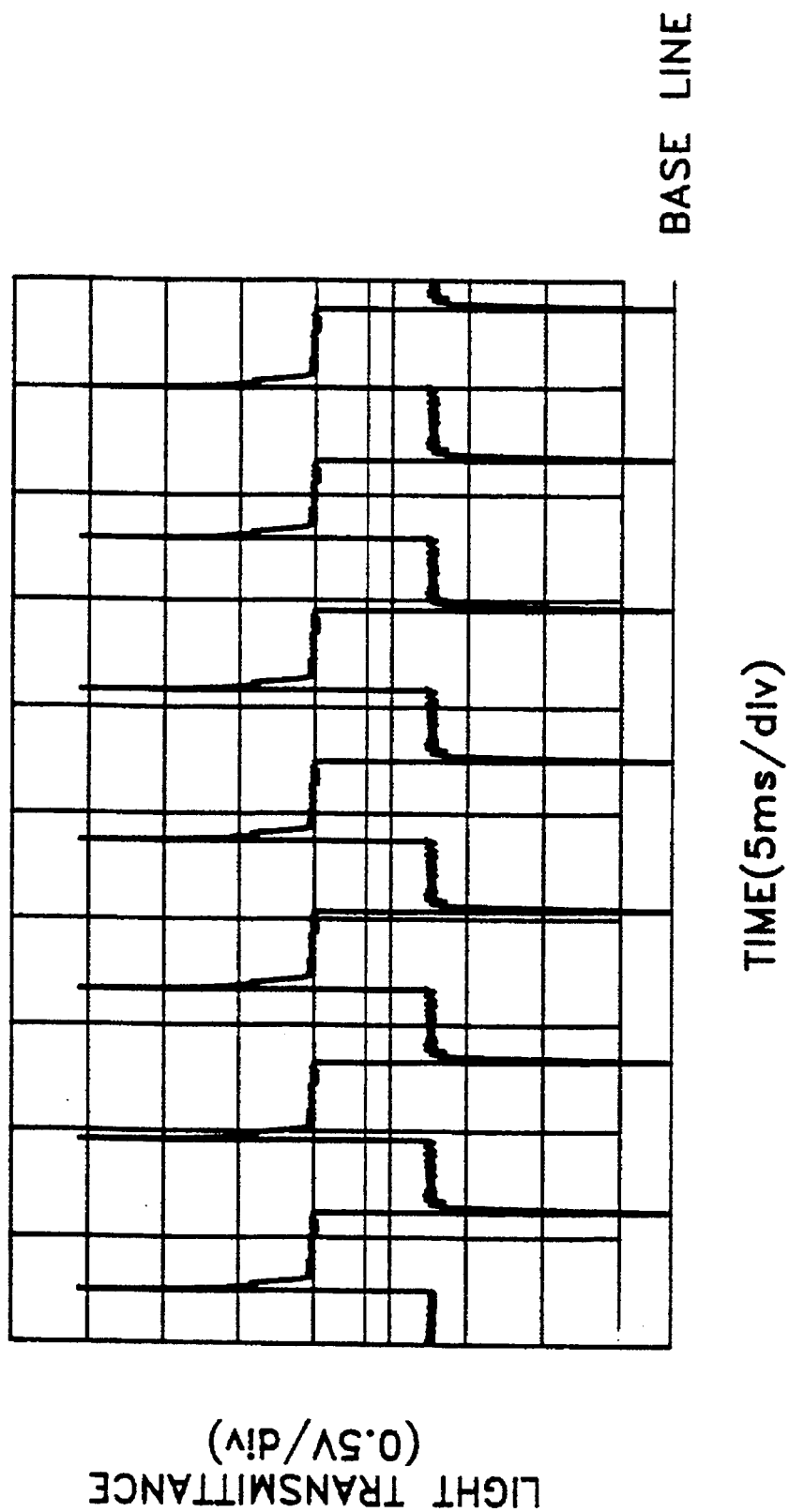
FIG. 5 represents bistability and contrast ratio of a LCD according to Comparative Example 3 where a PCBEA side-chain liquid crystal polymer is used as an orientation layer.
Figure 6:
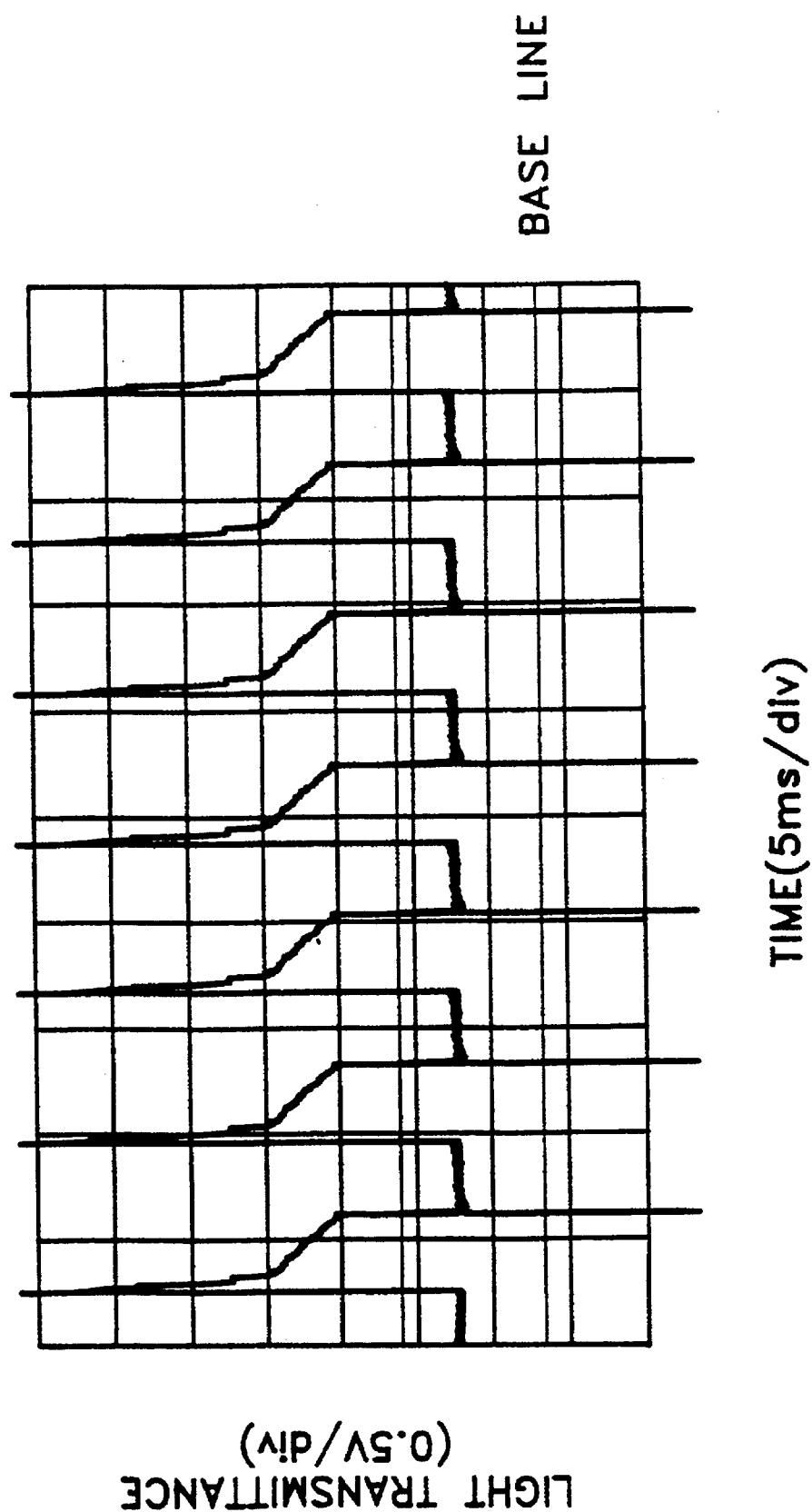
FIG. 6 represents the bistability and contrast ratio of a LCD according to Comparative Example 4 when a PMB-CCP side-chain liquid crystal polymer is used as an orientation layer.

As for the ferroelectric liquid crystal of the Comparative Examples 3 and 4 using the side-chain liquid crystal polymer, the orientation characteristic and electro-optic characteristic are worse than those obtained by using the main-chain liquid crystal polymer of the present invention. FIG. 5 represents bistability and contrast ratio of the liquid crystal when using the side-chain liquid crystal polymer PCBEA as an orientation layer. It is shown that memory stability and contrast ratio are not good when compared with those of the present invention. From the characteristic diagram of FIG. 6 obtained by using PMBCCP as an orientation layer according to the Comparative Example 4, no bistability is obtained and the relaxation of liquid crystal molecules occurs continuously when eliminating the electric field.

As described above, by using the main-chain liquid crystal polymer of the present invention as an orientation layer, a liquid crystal display device having uniform orientation, a good electro-optical characteristic which exhibits little or no orientation disruption, and excellent memory characteristics can be manufactured.

What is claimed is:

1. A ferroelectric liquid crystal display device comprising a pair of upper and lower substrates, transparent electrodes formed on each substrate, orientation layers formed on each transparent electrode and rubbed in a prescribed direction, and a ferroelectric liquid crystal injected between said orientation layers, wherein said orientation layer comprises a main-chain polyester liquid crystal polymer having the following formula I:

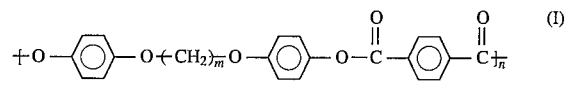

wherein m is an integer between 4 and 12 and n is an integer between 100 and 200.

2. A ferroelectric liquid crystal display device comprising a pair of upper and lower substrates, transparent electrodes formed on each substrate, orientation layers formed on each transparent electrode and rubbed in a prescribed direction, and a ferroelectric liquid crystal injected between said orientation layers, wherein said orientation layer comprises a main-chain polyester liquid crystal polymer has the following formula III:

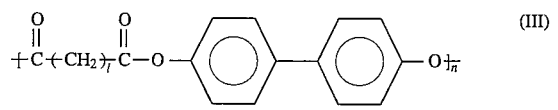

wherein l is an integer between 4 and 12 and n is an integer between 100 and 200.

* * * * *

UNITED STATES PATENT AND TRADEMARK OFFICE
CERTIFICATE OF CORRECTION

PATENT NO. : 5,599,593
DATED : February 4, 1997
INVENTOR(S) : Chung

It is certified that error appears in the above-indentified patent and that said Letters Patent is hereby corrected as shown below:

```
Item 57: Abstract; in the last line, change

"f" to --l--;

Column 8, Line 59, change "1" to --l--.
```

Signed and Sealed this

Twenty-second Day of April, 1997

Attest:

BRUCE LEHMAN

*Commissioner of Patents and Trademarks*

*Attesting Officer*